No. 834,008. PATENTED OCT. 23, 1906.
M. GRIER.
MOTOR VEHICLE.
APPLICATION FILED SEPT. 9, 1905.
3 SHEETS—SHEET 3.
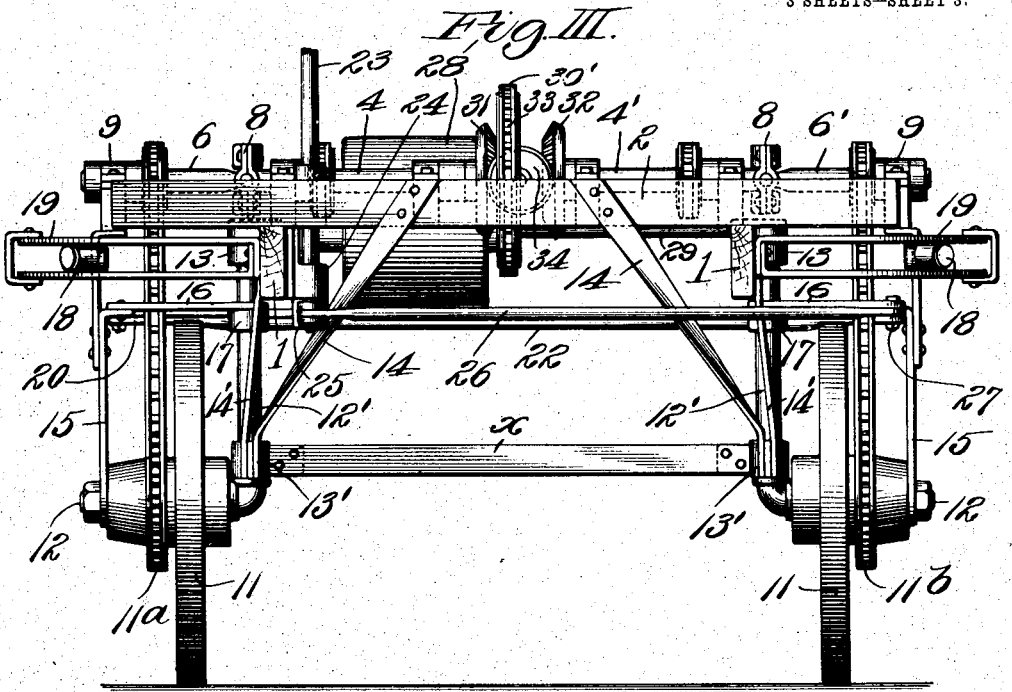
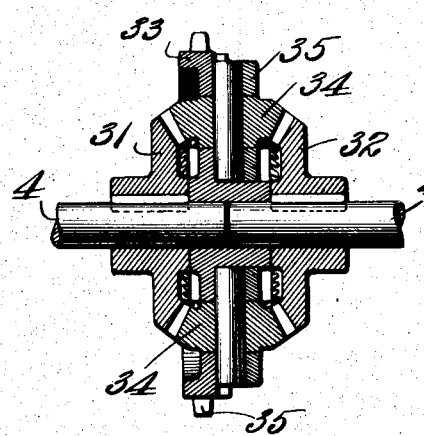
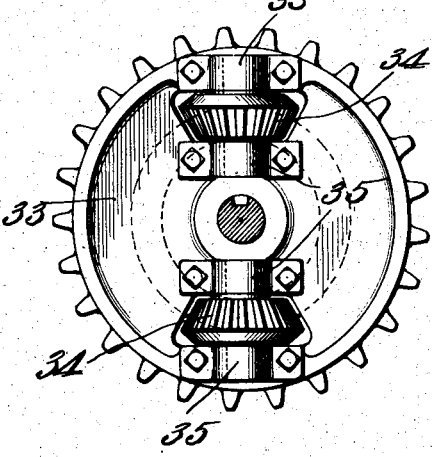
Attest:
Inventor:
Monroe Grier,

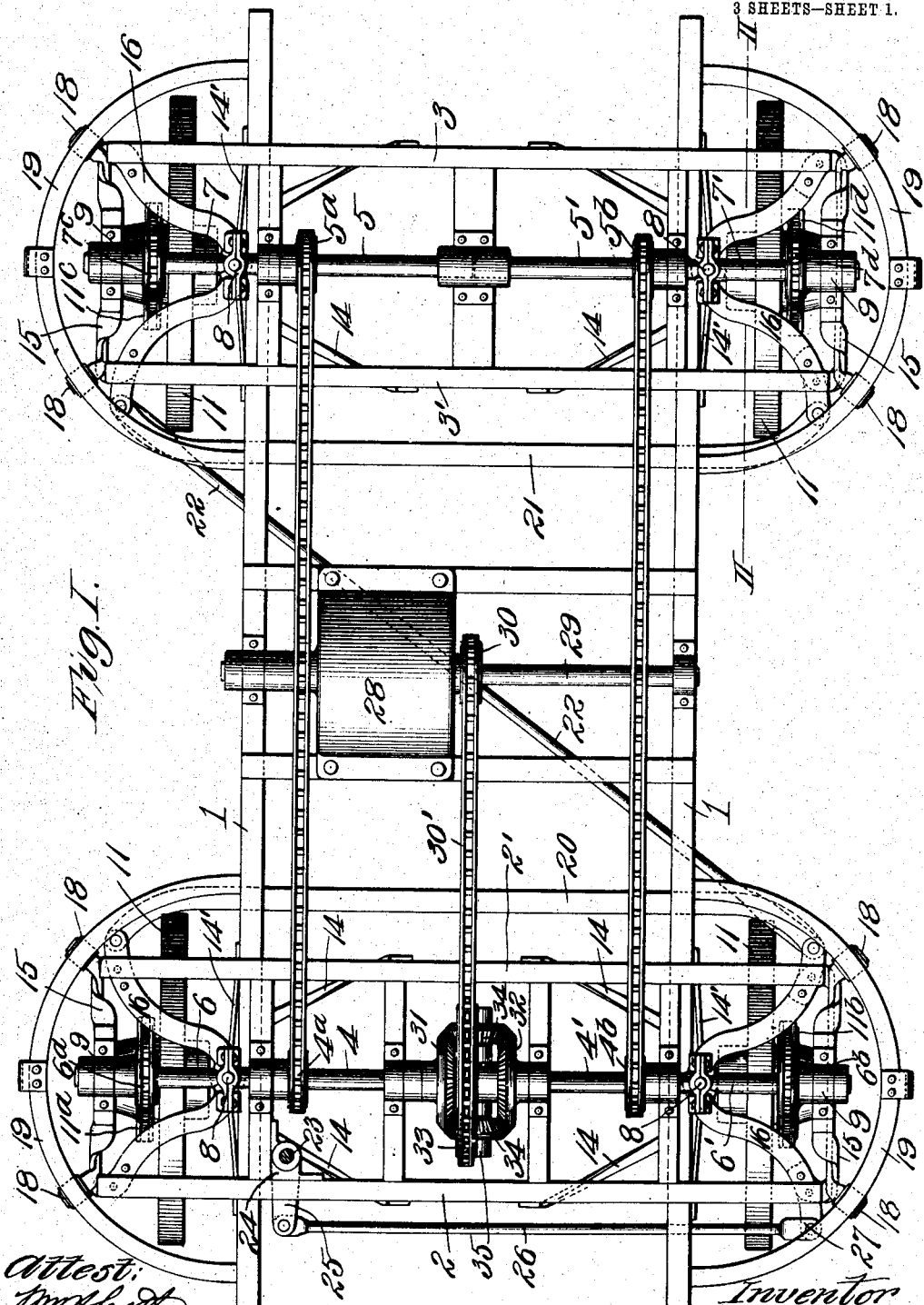

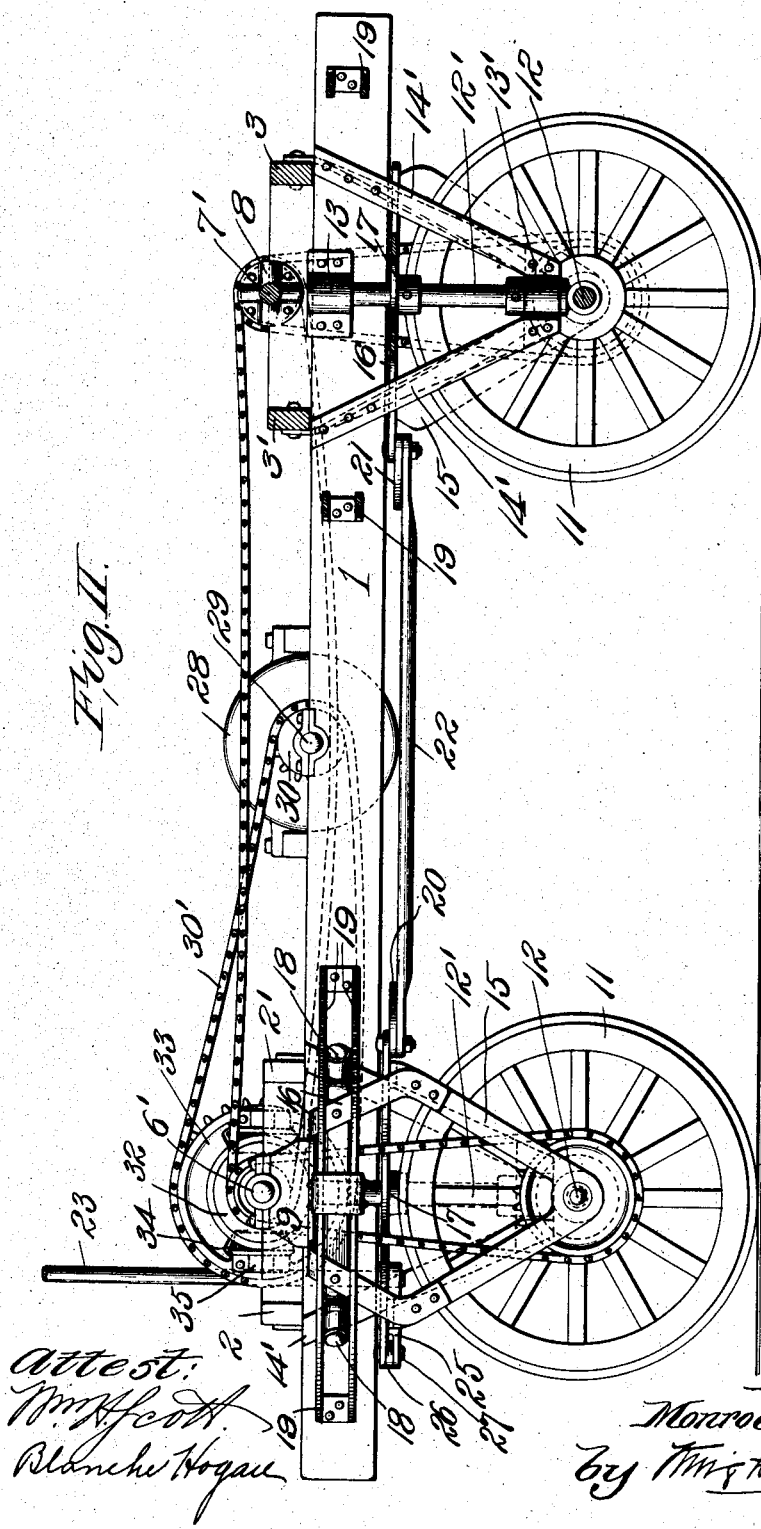

UNITED STATES PATENT OFFICE.

MONROE GRIER, OF PATTONVILLE, MISSOURI, ASSIGNOR OF ONE-HALF TO ALBERT C. KUNZE, OF ST. LOUIS, MISSOURI.

MOTOR-VEHICLE.

No. 834,008.      Specification of Letters Patent.      Patented Oct. 23, 1906.

Application filed September 9, 1905. Serial No. 277,753.

*To all whom it may concern:*

Be it known that I, MONROE GRIER, a citizen of the United States, residing in Pattonville, in the county of St. Louis and State of Missouri, have invented certain new and useful Improvements in Motor-Vehicles, of which the following is a full, clear, and exact description, reference being had to the accompanying drawings, forming part of this specification.

My invention relates to a motor-vehicle, and has for its object to provide a construction wherein the main frame and body is carried upon and propelled by four traction-wheels pivotally connected thereto. These wheels are all universally connected in such manner as to render them steering or guiding wheels and at the same time are all driven from a common source of power, whereby they all become traction-wheels.

Other features of the invention reside in the novel construction, arrangement, and combination of the several parts, as will hereinafter be described and afterward pointed out in the claims.

Figure I is a top or plan view of my motor-vehicle. Fig. II is a side view, partially in vertical section, on line II II, Fig. I. Fig. III is an end view. Fig. IV is a cross-section of the differential gearing employed. Fig. V is a side view of the differential gearing with one of the bevel-gears omitted.

The main frame of the vehicle consists of side sills 1 and transverse sills or transoms 2 2' and 3 3'. Mounted upon the main frame and suitably journaled thereon are driving-shafts 4 4' and 5 5' parallel with and preferably midway between the transoms 2 2' and 3 3', respectively.

6 6' and 7 7' are shafts which are connected by universal joints 8 to the outer ends of the shafts 4 4' and 5 5', respectively, and are suitably journaled in bearings 9, which journals are carried by certain mechanism about to be explained.

So far as the details of construction of the four driving and steering wheels, their mountings, &c., are concerned they are practically of the same construction. Hence in the following description I will confine myself to but one of them. I will here state, however, that these wheels are practically what is known as "caster-wheels" and which, due to their nature, do not require to be connected by axles to unite both front and both rear wheels. As all of these wheels are driven from mechanism located above them, I have an entirely free space between them, which is desirable in that obstructions upon the road will not produce any ill effect upon the machine. In the drawings (see Fig. III) I have shown a tie bar or brace *x* between the wheel-brackets to render the structure more rigid. This, however, may be dispensed with in some instances.

11 indicates one of the driving and steering wheels, which is movably mounted upon a horizontal axle 12, which has preferably formed integral therewith a vertical member 12' in the form of a rock-shaft and is journaled in upper and lower bearings 13 13', the former of which is carried by a side sill 1, while the latter is carried or supported by braces or straps 14 14', which depend from the main frame of the vehicle. (See Fig. II.) This rock-shaft 12' is designed to have its axis in direct alinement with the center of the before-mentioned universal joint 8 for obvious reasons.

15 indicates a bracket mounted upon the outer end of the axle 12, which is attached to or, if desired, may be formed integral with a member 16, secured to the rock-shaft 12' at the point 17. Secured to this framework formed by the bracket 15 and member 16 is the journal 9 of shaft 6. Also mounted upon said frame are rollers 18, which are designed to coöperate with a semicircular bracing-track 19, secured to and extending outwardly from the side sill 1 of the vehicle-frame. The point from which the radius of this track is formed being the center of the rock-shaft 12', it will be observed that the frame just described and its carried rollers in their coöperation with the circular track 19 constitute braces for the ground-wheels. The front and back ground-wheels of the vehicle are respectively connected by transverse rods 20 21, which for the sake of convenience are pivotally secured to the brackets 15 or 16. A rod 22 is employed to connect one front wheel with the rear wheel at the opposite side of the vehicle, said rod being, as is clearly illustrated in Fig. 1, diagonally disposed and having its ends pivotally secured at the junction of one of each of the rods 20 21.

23 indicates a steering-staff, which is suitably journaled in a bracket 24, secured to the main frame of the vehicle and upon the lower end of which is secured an arm 25. Pivotally secured to the arm of the staff is a rod or link 26, the other end of which rod 26 is pivotally secured to the frame or bracket 15, as at 27.

It is apparent from the construction just described that when the steering-staff is rocked in either direction all of the ground-wheels of the vehicle will be turned in the proper direction for making a curve.

28 indicates a motor of any suitable character, which is mounted upon the main frame of the vehicle and is designed to impart motion to a shaft 29, likewise mounted upon the main frame.

30 indicates a sprocket-wheel mounted upon the shaft 29 and which, through the medium of a suitable chain 30', transmits motion to a differential-gearing mechanism which coöperates with the shafts 4 4' for well-understood reasons. The ground-wheels of the vehicle are provided with sprocket-wheels 11$^a$ 11$^b$ and 11$^c$ 11$^d$, secured thereto, and each of the shafts 6 6' and 7 7' are likewise provided with sprocket-wheels 6$^a$ 6$^b$ and 7$^c$ 7$^d$, said sprocket-wheels being respectively connected by sprocket-chains.

The shafts 4 and 5 and 4' and 5' are provided with sprocket-wheels 4$^a$ and 5$^a$ and 4$^b$ and 5$^b$, respectively, and are connected by sprocket-chains.

It will be observed that no differential gearing is employed to coöperate with the shafts 5 5', for the reason that they are directly connected with the shafts 4 4' and will hence take only the speed imparted to them by said shafts.

The differential gearing I employ is best illustrated in Figs. IV and V of the drawings, and while I do not claim its construction *per se* as my invention I will briefly describe the same in order to more clearly bring out other features of my invention.

Keyed or otherwise secured to the inner ends of the shafts 4 and 4', respectively, are bevel-gears 31 and 32, and interposed therebetween and loosely mounted upon the extreme inner ends of said shafts 4 and 4' is a sprocket-wheel 33. This sprocket-wheel is provided with two pinions 34, mounted in suitable boxes 35, carried by said sprocket-wheel formed thereon, which pinions are designed to be at all times in mesh with the bevel-gears 31 and 32, the same being accomplished by the formation of apertures in the web portion of the sprocket-wheel 33 and in which a portion of said pinions are located. The chain 30', before mentioned, connects the sprocket-wheel 30 and the sprocket-wheel 33 of this differential gear. Hence it will be understood that when the vehicle is running on a straight course—*i. e.*, when the front and rear wheels are in alinement—the pinions 34 do not rotate on their own axes, but merely revolve around the axes of shafts 4 4', and being in mesh with the gears 31 and 32 cause them and their respective shafts to rotate.

When the wheels of the vehicle are moved in such manner as to cause them to make a curve, the wheels representing the shorter radii of the circle about to be described are permitted to run slower than their companions, for the reason that the pinions 34 will not only revolve about the axes of shafts 4 4', but are permitted to turn upon their own axes in such manner as to compensate for the variation in speed that the two shafts 4 4' must make to effect the desired end.

I claim as my invention—

1. In a motor-vehicle, the combination of two pairs of traction-wheels, a frame carried thereby and supported thereabove, a power-supplying element mounted on said frame, a sectional shaft for each pair of said wheels supported by said frame, means connecting said shaft with said wheels for rotating the latter, a single differential-gearing mechanism carrried by the sectional shafts corresponding to one pair of said wheels, and power-transmitting means leading from the last-named sectional shaft to the other sectional shaft, substantially as set forth.

2. In a motor-vehicle, the combination with a plurality of traction-wheels, vertically-disposed rock-shafts supported by said wheels, a frame carried by said wheels, a driven shaft mounted upon said frame and provided with a universal joint in alinement with the axis of said vertically-disposed rock-shaft, and gearing connecting said driven shaft and said wheels, substantially as set forth.

3. In a motor-vehicle, the combination of a main frame, a plurality of ground-wheels for supporting said main frame, rockable frames journaled to said main frame and with which said ground-wheels are associated, and bracing-tracks for said rockable frames carried by said main frame, substantially as set forth.

4. In a motor-vehicle, the combination of a main frame, a plurality of ground-wheels for supporting said main frame, rockable frames journaled to said main frame and with which said ground-wheels are associated, and semicircular bracing-tracks for said rockable frames carried by said main frame, substantially as set forth.

5. In a motor-vehicle, the combination of a main frame, a plurality of ground-wheels for supporting said main frame, rockable frames journaled to said main frame and with which said ground-wheels are associated, bracing-tracks for said rockable frames carried by said main frame, and rollers carried by said rockable frame arranged to ride against said tracks, substantially as set forth.

6. In a motor-vehicle, the combination of a main frame, a plurality of ground-wheels for supporting said main frame, rockable frames journaled to said main frame and with which said ground-wheels are associated, semicircular bracing-tracks for said rockable frames carried by said main frame, and rollers carried by said rockable frame arranged to ride against said tracks, substantially as set forth.

7. In a motor-vehicle, the combination of a main frame, two pairs of ground-wheels for supporting said main frame, rockable frames journaled to said main frame and with which said ground-wheels are associated, transverse rods having their ends pivoted to the rockable frames corresponding to each pair of wheels, a rod pivoted at one end to one of the rockable frames at one end of the vehicle and pivoted to another of said rockable frames that is diagonally disposed relative to the first named, and means connected to one of said rockable frames whereby all of said frames are rocked simultaneously, substantially as set forth.

MONROE GRIER.

In presence of—
BLANCHE HOGAN,
WM. H. SCOTT.